United States Patent
Zhong et al.

(10) Patent No.: US 9,633,272 B2
(45) Date of Patent: Apr. 25, 2017

(54) REAL TIME OBJECT SCANNING USING A MOBILE PHONE AND CLOUD-BASED VISUAL SEARCH ENGINE

(71) Applicant: Yahoo! Inc., Sunnyvale, CA (US)

(72) Inventors: Yu Zhong, Rochester, NY (US); Pierre Garrigues, San Francisco, CA (US); Benjamin Jackson Culpepper, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/768,051

(22) Filed: Feb. 15, 2013

(65) Prior Publication Data
US 2014/0233854 A1 Aug. 21, 2014

(51) Int. Cl.
*G06K 9/00* (2006.01)
*G06K 9/03* (2006.01)

(52) U.S. Cl.
CPC ......... *G06K 9/036* (2013.01); *G06K 9/00671* (2013.01)

(58) Field of Classification Search
None
See application file for complete search history.

(56) References Cited

U.S. PATENT DOCUMENTS

| | | | |
|---|---|---|---|
| 5,309,526 A | 5/1994 | Pappas et al. | |
| 5,496,270 A | 3/1996 | Nettekoven | |
| 5,913,205 A | 6/1999 | Jain et al. | |
| 6,421,690 B1 | 7/2002 | Kirk | |
| 6,677,948 B1 | 1/2004 | Wasserman et al. | |
| 7,113,918 B1 | 9/2006 | Ahmad et al. | |
| 7,139,784 B2 | 11/2006 | Knobe et al. | |
| 7,148,913 B2 | 12/2006 | Keaton et al. | |
| 7,184,100 B1* | 2/2007 | Wilf et al. | 348/700 |
| 7,352,292 B2 | 4/2008 | Alter et al. | |
| 7,509,353 B2 | 3/2009 | Kelkar et al. | |
| 7,657,100 B2 | 2/2010 | Gokturk et al. | |
| 7,675,461 B1 | 3/2010 | McCusker et al. | |
| 7,854,509 B2 | 12/2010 | Johns | |
| 7,961,117 B1 | 6/2011 | Zimmerman et al. | |
| 8,050,503 B2 | 11/2011 | Dekel et al. | |
| 8,134,614 B2 | 3/2012 | Fujii | |
| 8,134,624 B2 | 3/2012 | Solhusvik et al. | |
| 8,150,216 B2 | 4/2012 | Retterath et al. | |
| 8,173,818 B2 | 5/2012 | Singh et al. | |
| 8,214,309 B1 | 7/2012 | Khosla et al. | |

(Continued)

FOREIGN PATENT DOCUMENTS

| | | |
|---|---|---|
| TW | 201250506 | 12/2012 |
| WO | 2011/043982 | 4/2011 |

OTHER PUBLICATIONS

Chen et al., "Streaming mobile augmented reality on mobile phones", ISMAR 2009.*

(Continued)

*Primary Examiner* — Soo Jin Park
(74) *Attorney, Agent, or Firm* — Weaver Austin Villeneuve & Sampson LLP

(57) ABSTRACT

A system for tagging an object comprises and interface and a processor. The interface is configured to receive an image. The processor is configured to determine a key frame. Determining a key frame comprises determining that the image is stable. The processor is configured to determine a tag for an item in the key frame.

25 Claims, 8 Drawing Sheets

(56) References Cited

U.S. PATENT DOCUMENTS

| | | | |
|---|---|---|---|
| 8,265,866 B2 | 9/2012 | Altamura et al. | |
| 8,321,293 B2 | 11/2012 | Lewis et al. | |
| 8,438,084 B1* | 5/2013 | Tesler et al. | 705/29 |
| 8,478,052 B1 | 7/2013 | Yee et al. | |
| 8,605,141 B2* | 12/2013 | Dialameh et al. | 348/62 |
| 8,856,021 B2* | 10/2014 | Carmel | G06Q 10/10 705/300 |
| 9,182,891 B2* | 11/2015 | Adarraga | H04L 65/403 |
| 9,396,400 B1* | 7/2016 | Teichman | G06K 9/00771 |
| 2003/0048928 A1 | 3/2003 | Yavitz | |
| 2006/0107297 A1 | 5/2006 | Toyama et al. | |
| 2006/0274978 A1 | 12/2006 | Fukuda et al. | |
| 2007/0005571 A1 | 1/2007 | Brewer et al. | |
| 2007/0033531 A1 | 2/2007 | Marsh | |
| 2007/0110338 A1 | 5/2007 | Snavely et al. | |
| 2007/0177805 A1 | 8/2007 | Gallagher | |
| 2007/0274978 A1 | 11/2007 | Danielson et al. | |
| 2008/0080745 A1 | 4/2008 | Vanhoucke et al. | |
| 2008/0144943 A1 | 6/2008 | Gokturk et al. | |
| 2008/0152231 A1 | 6/2008 | Goturk et al. | |
| 2008/0317349 A1* | 12/2008 | Ishikawa | 382/190 |
| 2009/0034782 A1 | 2/2009 | Gering | |
| 2009/0153799 A1 | 6/2009 | Johns | |
| 2009/0257663 A1 | 10/2009 | Luo et al. | |
| 2010/0046842 A1 | 2/2010 | Conwell | |
| 2010/0070483 A1 | 3/2010 | Delgo et al. | |
| 2010/0070523 A1 | 3/2010 | Delgo et al. | |
| 2010/0125605 A1 | 5/2010 | Nair et al. | |
| 2010/0125805 A1 | 5/2010 | Stoos | |
| 2011/0016150 A1 | 1/2011 | Engstrom et al. | |
| 2011/0064302 A1 | 3/2011 | Ma et al. | |
| 2011/0145043 A1* | 6/2011 | Handel | G06Q 30/02 705/14.2 |
| 2011/0184972 A1 | 7/2011 | Ard et al. | |
| 2011/0196859 A1 | 8/2011 | Mei et al. | |
| 2011/0216179 A1 | 9/2011 | Dialameh et al. | |
| 2011/0244919 A1 | 10/2011 | Aller et al. | |
| 2011/0264570 A1 | 10/2011 | Houseworth et al. | |
| 2011/0298932 A1 | 12/2011 | Gorian et al. | |
| 2012/0011119 A1 | 1/2012 | Baheti et al. | |
| 2012/0011142 A1 | 1/2012 | Baheti et al. | |
| 2012/0098981 A1 | 4/2012 | Ip et al. | |
| 2012/0102050 A1 | 4/2012 | Button et al. | |
| 2012/0235988 A1 | 9/2012 | Karafin et al. | |
| 2012/0299961 A1 | 11/2012 | Ramkumar et al. | |
| 2012/0308077 A1 | 12/2012 | Tseng | |

OTHER PUBLICATIONS

Adams et al., "Viewfinder alignment", Eurographics 2008.*
Herling et al., "Chapter 11 markerless tracking for augmented reality", Handbook of Augmented Reality 2011.*
Sudol et al., "LookTel—a comprehensive platform for computer-aided visual assistance", CVPRW 2010.*
Bay et al., "SURF: speeded up robust features", ECCV 2006, part I, LNCS 3951, pp. 404-417, 2006.*
Bigham et al., "The design of human-powered access technology", ASSETS 2011, Oct. 2011.*
Nourani-Vatani et al., "A study of feature extraction algorithms for optical flow tracking", PaCRA Dec. 2012.*
Sorokin et al., "Utility data annotation with Amazon Mechanical Turk", 2008 IEEE Computer Society Conference on Computer Vision and Pattern Recognition Workshop.*
Lasecki et al., "Real-time crowd control of existing interfaces", UIST'11, 2011.*
Bigham et al., "VizWiz: nearly real-time answers to visual questions", UIST'10, 2010.*
Geiger et al., "Managing the Crowd: Towards a Taxonomy of Crowdsourcing Processes", Proceedings of the Seventeenth Americas Conference on Information Systems, Detroit, Michigan Aug. 4-7, 2011.*
Yan et al., "CrowdSearch: exploiting crowds for accurate real-time image search on mobile phones", MobiSys' 10, Jun. 15-18, 2010.*
Bigham et al., "VizWiz::Locatelt—enabling blind people to locate objects in their environment", CVPRW 2010.*
WO patent application No. PCT/US2014/014293, International Search Report and Written Opinion mailed May 30, 2014.
U.S. Appl. No. 13/016,776, "Any-image labeling engine," Garrigues et al., filed Jan. 28, 2011.
U.S. Appl. No. 13/016,779, "Monitoring an any-image labeling engine," Garrigues et al., filed Jan. 28, 2011.
U.S. Appl. No. 13/016,776, Office Action mailed Dec. 12, 2012.
U.S. Appl. No. 13/016,776, Office Action mailed Jul. 2, 2013.
U.S. Appl. No. 13/016,776, Office Action mailed Aug. 8, 2014.
U.S. Appl. No. 13/016,779, Office Action mailed Jan. 16, 2013.
U.S. Appl. No. 13/016,779, Office Action mailed Aug. 8, 2013.
U.S. Appl. No. 13/016,779, Office Action mailed Aug. 28, 2014.
Cula, Oana G. et al., "Compact representation of bidirectional texture functions," 2001 IEEE 0-7695-1272-0/01, 1041-1047.
Christmas, William J. et al., "Structural matching in computer vision using probabilistic relaxation," IEEE transactions on pattern analysis and machine intelligence, vol. 17, No. 8, Aug. 1995.
Chakravarty, Indranil et al., "Characteristic views as a basis for three-dimensional object recognition," SPIE vol. 336 Robot Vision, 1982.
Fisher, Matthew et al., "Context-based search for 3D models," ACM Transactions of Graphics, vol. 29, No. 6, Article 182, Dec. 2010.
ACM Digital Library results: image tagging with computer vision match and user vision match, Jan. 12, 2013.
Cucchiara, R. et al., "Intelligent Distributed Surveillance Systems—Computer vision system for in-house video surveillance," IEE Proc.-Vis. Image Signal Process, vol. 152, No. 2, Apr. 2005.
Google Scholar results: computer vision match and humans vision match and query of the image, Dec. 7, 2012.
Toyama, Kentaro et al., "Geographic location tags on digital images," ACM 1-58113-722-2/03/0011, Nov. 2003.
U.S. Appl. No. 13/016,776, Notice of Allowance mailed Jan. 21, 2015.
Google Scholar results: analyze images and determine computer and human vision match, Jan. 9, 2015.
ACM Digital Library, search results: a computer vision match is determined to be inadequate if/when the computer vision match lacks specificity or a probability associated with the computer vision match indicates that the computer vision match is not a strong match, Jan. 9, 2015.
IEEE Xplore search results: analyze the image associated with the image query using a human vision analysis system to determine one or more human vision matches, wherein each human vision match includes one or more human vision tags associated with the image, Jan. 9, 2015.
U.S. Appl. No. 13/016,779, Office Action mailed Apr. 22, 2015.
U.S. Appl. No. 13/016,779, Notice of Allowance mailed Aug. 14, 2015.
TW patent application No. 103104388, Office Action mailed Jan. 18, 2016.
TW patent application No. 103104388, Examination Opinion mailed Aug. 26, 2016.

* cited by examiner

REAL TIME OBJECT SCANNING USING A MOBILE PHONE AND CLOUD-BASED VISUAL SEARCH ENGINE

BACKGROUND OF THE INVENTION

Mobile phones and smart mobile phones are becoming extremely common. Many people now carry everywhere a device that includes a powerful processor, a high-resolution video camera, and a connection to the Internet. One possible practical application of these devices is image recognition. When a smart phone user is presented with an item that he desires to know more about, he can photograph the item and use image recognition software to identify it. Depending on his preferences he may simply be given the name of the object, or automatically be connected with search results regarding the object, shopping information regarding the object, or any other appropriate information. A particularly useful application of this technology is for visually impaired people; enabling them to identify objects they are not able to identify themselves without assistance. Frequently, when a user takes a photo with a smart phone for the purposes of object identification, the user does not take the photo that best enables the object to be identified—for instance, the image can be blurry or from an angle that makes recognition difficult. This is particularly a problem when assisting blind users, as they cannot see the photo image themselves to verify its quality.

BRIEF DESCRIPTION OF THE DRAWINGS

Various embodiments of the invention are disclosed in the following detailed description and the accompanying drawings.

DETAILED DESCRIPTION

Figure 1:
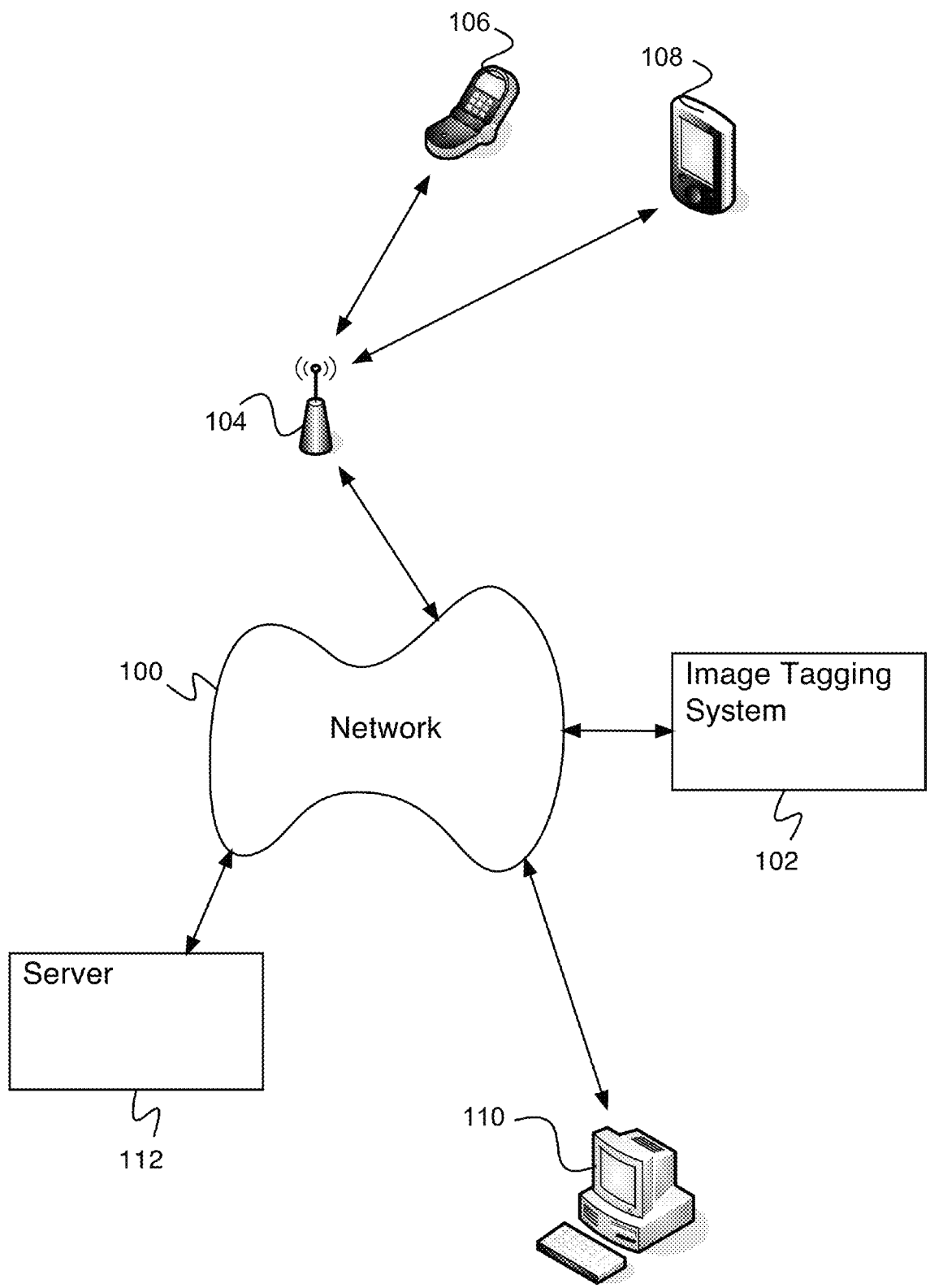
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Real time object scanning using a mobile phone and cloud-based visual search engine is disclosed. A system for tagging an object comprises a processor configured to: determine a key frame, wherein determining a key frame comprises: determining if an image is stable; and in the event that the image is stable: determining if the image has been stable for a predetermined duration; and in the event that the image has been stable for the predetermined duration: identifying the current frame as a key frame; and determine a tag for an item in the key frame. A memory is coupled to the processor and is configured to provide the processor with instructions. An interface is configured to receive an image (e.g., for processing by the processor).

In some embodiments, real time object identification is performed using a mobile phone including a camera and a processor. A mobile phone user performs real time object identification by initiating the object identification process (e.g., by launching an app) and holding their phone steady so the camera captures a steady image of the object of interest. Rather than the user making an indication (e.g., pushing a button, manually triggering, voice triggering, etc.) that the image is of the desired object, the app determines that the image is steady (e.g., features of interest are not blurry), when the image has been steady for a predetermined duration, and when the visual content is sufficiently different from the previous key frames, the image is captured and processed. By analyzing each frame of the image stream, the app is able to ensure that a high quality image is received for image processing (e.g., in focus, within the frame, etc.). If the app requires the user to push a button to indicate that an image should be captured, it is forced to rely on the user to take a good quality image. This is particularly burdensome when the app is used for assisting a blind user, who will likely have difficulty taking a high quality image.

In some embodiments, an image is steady in the event that an object of interest is within a camera view for a predetermined time. In some embodiments, a steady image refers to an image from the perspective of a device with a camera, where the image, or rather stream of images, includes the same subject matter within the view of the camera. In some embodiments, the image is received via an interface to be processed. In some embodiments, the image or stream of images is steady or within the view of the camera for a predetermined period of time. In some embodiments, the predetermined period of time is indicative of a length of time to express the intent of interest in the objects in the view of the camera.

In some embodiments, when the object identification process is initiated, the processor receives an image stream from the camera. Each image frame is analyzed until a key frame is detected. A key frame comprises an image frame where the image is steady and has been held steady over a predetermined duration, and where the visual content is different from the previous key frames. When a key frame is detected, the image is provided to object identification software for identifying an object in the image. In some embodiments, the object is identified by an automated object identification process. In some embodiments, the object is identified by a human object identifier. In some embodiments, it is determined whether the object can be identified by an automated object identification process, and if not, the object is identified by a human object identifier.

In some embodiments, the system comprises a processor for image recognition which performs the expensive computation of analyzing a new object and a key frame processor which performs the less expensive identification of frames that are susceptible frames to having a new object. If the frame is identified as being susceptible by the key frame processor, the frame is sent on to the image recognition processor.

FIG. 1 is a block diagram illustrating an embodiment of a network system. In the example shown, the network system of FIG. 1 comprises image tagging system 102 communicating with network 100. The network system of FIG. 1 performs real time object scanning using a mobile phone (e.g., smart mobile phone 108) and a cloud-based visual search engine (e.g., image tagging system 102). In some embodiments, the image tagging system is on the mobile device where key frame identification happens. In some embodiments, object recognition is performed on the cloud-based visual search engine due to the power consumption load it requires. Image tagging system 102 comprises a system for assigning tags to objects in images. In various embodiments, network 100 comprises one or more of the following: a local area network, a wide area network, a wired network, a wireless network, the Internet, a cellular network, or any other appropriate network. In the example shown, a user submits an image to be tagged to image tagging system 102 via network 100. In some embodiments, the image to be tagged is created using a mobile device (e.g., camera enabled cellular telephone 106, smart mobile phone 108, or another mobile device, for instance a wireless enabled digital camera, a tablet computer, a laptop, a tablet, a camera, etc.) and conveyed to network 100 via wireless access point 104. In some embodiments, the image to be tagged is located on a user's home computer (e.g., computer 110), either after it was uploaded by the user from a digital camera or other image creation device or downloaded from the Internet, and is submitted through a wired connection to network 100. In some embodiments, the image tagging system user comprises a web site or other computing system that uses image tagging as part of its service, and images are submitted from the user's system server (e.g., server 112) through network 100, to image tagging system 102.

Figure 2:
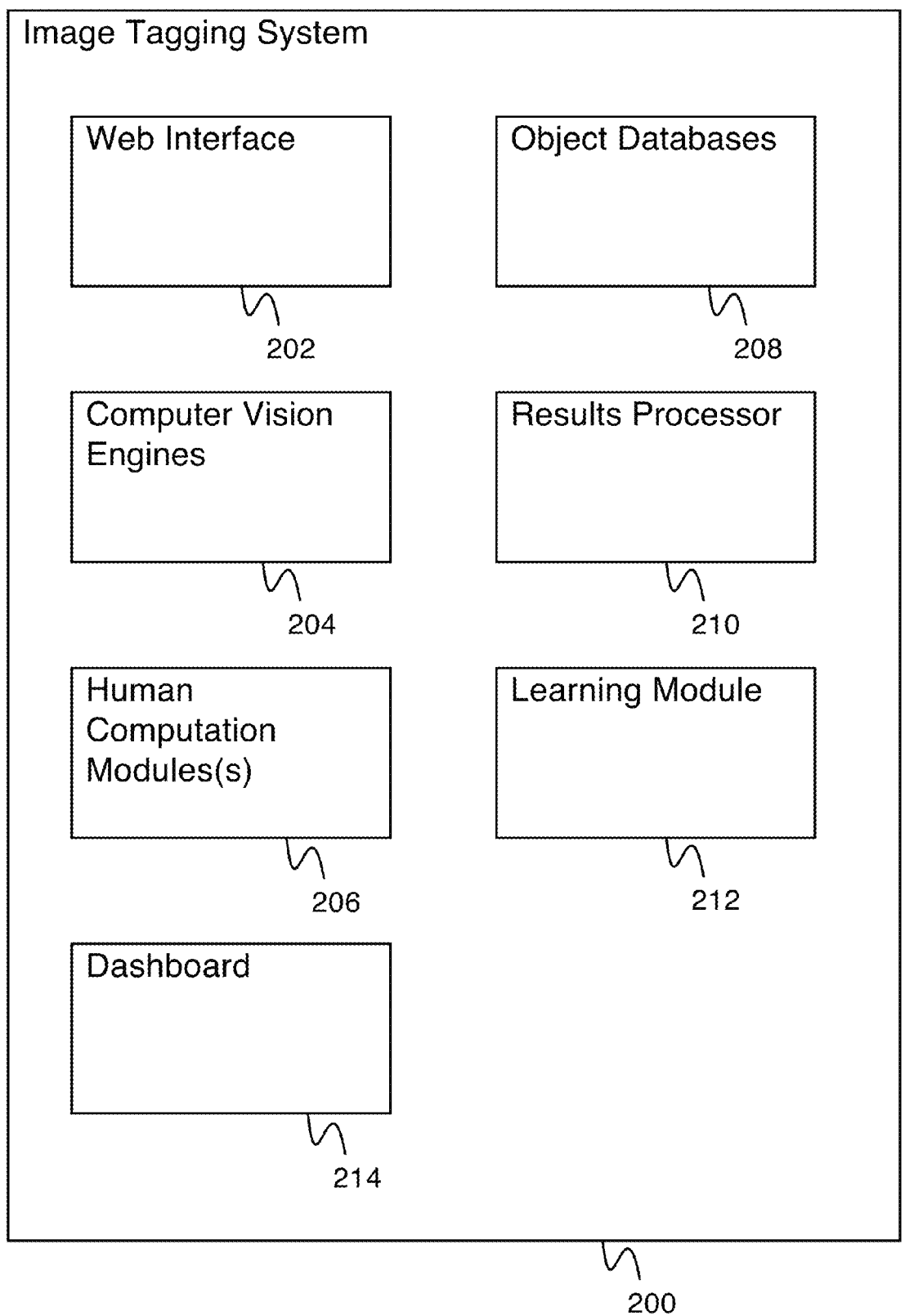
FIG. 2 is a block diagram illustrating an embodiment of an image tagging system.

FIG. 2 is a block diagram illustrating an embodiment of an image tagging system. In some embodiments, image tagging system 200 comprises image tagging system 102 of FIG. 1. Image tagging system 200 comprises an image tagging system for receiving an image and providing one or more tags for one or more objects in the image. In the example shown, image tagging system 200 comprises web interface 202, computer vision engines 204, human computation module(s) 206, object databases 208, results processor 210, learning module 212, and dashboard 214. Web interface 202 comprises an interface accessible through the World Wide Web for submitting images to image tagging system 200. In some embodiments, web interface 202 comprises a graphical user interface (GUI), enabling a user to easily submit images to image tagging system 202. In some embodiments, web interface 202 comprises an application programming interface (API), enabling a programmer to create software that submits images and other information to image tagging system 200 and receives tags from image tagging system 200. In some embodiments, web interface 202 uses a communication interface other than the World Wide Web (e.g., a local area network, a wide area network).

In the example shown, computer vision engines 204 comprises a set of one or more computer vision engines for automatically identifying objects in images received by image tagging system 200. In various embodiments, the computer vision engines use an instance recognition module, a classification module, an optical character recognition module, a face identification module, a barcode recognition module, a clock recognition module, a color detection module, or any other appropriate module. In some embodiments, each different module utilized by computer vision engines 204 is utilized by a separate computer vision engine. In some embodiments, computer vision engines 204 comprise more than one computer vision engine, and the separate computer vision engines execute their modules in parallel. In some embodiments, computer vision engines 204 utilize information stored in object databases 208 as part of executing computer vision modules. In some embodiments, an instance recognition module utilizes object databases 208 as its instance library. In some embodiments, a classification module utilizes object databases 208 as its class representation library.

In the example shown, human computation module(s) 206 comprises one or more human computation modules for image recognition. A human computation module for image recognition comprises one or more humans each capable of recognizing images and providing tags for the images. In some embodiments, a human computation module relays any tags provided by its humans directly to results processor 210. In some embodiments, a human computation module requests tags from human taggers. In some embodiments, a human computation module receives a request for tags from a results processor. In some embodiments, the human computation module provides various processing functionality prior to providing the tags to results processor 210. In various embodiments, processing functionality includes determining a status of a human tagger, determining a validity of a tag based on a status of a human tagger (e.g., valid tag is determined in the event that the tag is received from a tagger indicated as an expert or reliable tagger), confirming a validity of a tag based on receipt from multiple human taggers (e.g., valid tag is determined in the event that the same tag is received from a majority of taggers or a minimum number of taggers or both), marking a tag with a validity status based on a status of a human tagger, or any other appropriate processing functionality. In some embodiments, human computation module(s) 206 comprises more than one human computation module. In various embodiments, human taggers are divided into separate human computation modules based on specialty, experience, age, location, average time to provide results, tagger status, or any other appropriate tagger classification.

Results processor 210 comprises a results processor for receiving and processing tags from computer vision engines 204 and human computation module(s) 206. In the example shown, results processor 210 ranks the received tags according to a predetermined ranking algorithm and provides the highest ranked tag or tags to the image tagging system user (e.g., the user that originally provided the image). In various embodiments, the predetermined ranking algorithm utilizes a module ranking (e.g., tags received from a computer vision instance module rank more highly than tags received from a computer vision classification module), a module score (e.g., tags received from the same module are ranked based on a score assigned to them by the module they are received from), or any other appropriate ranking criteria. In some embodiments, results processor 210 requests tags from computer vision engines 204. In some embodiments, results processor 210 requests tags from human computation module(s) 206. In some embodiments, results processor 210 requests tags from human computation module(s) 206 in the event that computer vision engines 204 are not able to provide tags.

Learning module 212 comprises a module for updating object databases 208 based on the results of an image query. In some embodiments, if an instance recognition module or a classification module are able to determine tags for an image based on information stored in object databases 208 without finding an identical image stored in object databases 208, the learning module then stores the image in object databases 208 associated with the determined tags. In some embodiments, the learning module determines whether adding the image to object databases 208 will broaden the space of images associated with the determined tag. The learning module may then choose to store the image in object databases 208 only if it does broaden the space of images associated with the tag. In some embodiments, if computer vision engines 204 is not able to determine a tag associated with the image but human computation module(s) 206 is, learning module 212 stores the image and associated tag in object databases 208, so that the image can be automatically identified if it is submitted in future queries. In some embodiments, learning module 212 processes an image before storing it and any associated tags in object databases 208. In various embodiments, processing comprises background subtraction, object geometry processing, object class representation creation, or any other appropriate processing.

Dashboard 214 comprises an interface for an image tagging system administrator to gain information about the current status of the image tagging system. In the example shown, the dashboard system can provide information to a system administrator on image queries, tags that have been applied to images, system users, image taggers, and system status, as well as allowing the administrator to train the computer vision module by adding images and tags at his discretion.

Figure 3:
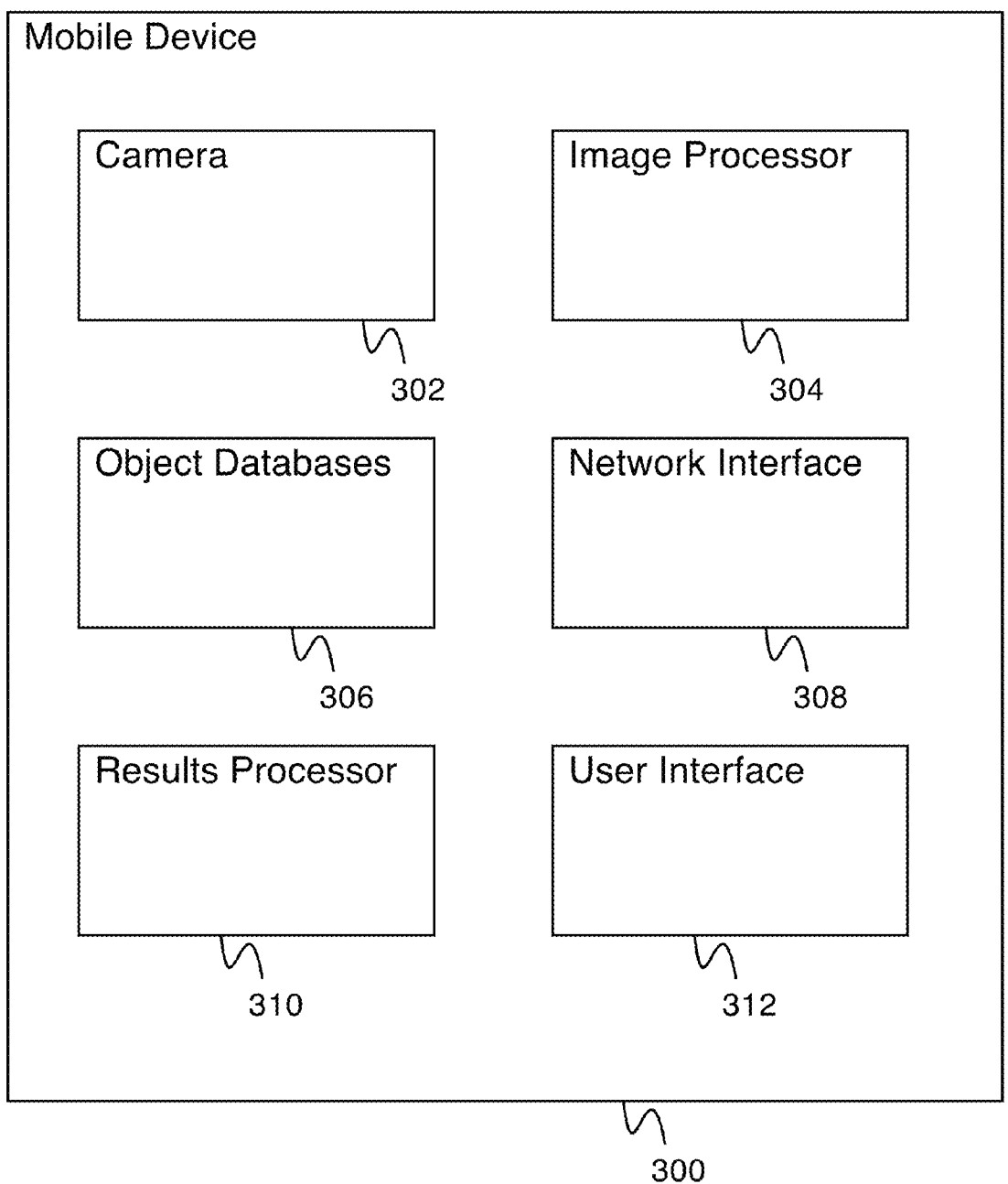
FIG. 3 is a block diagram illustrating an embodiment of a mobile device.

FIG. 3 is a block diagram illustrating an embodiment of a mobile device. In some embodiments, mobile device 300 comprises smart mobile phone 108 of FIG. 1. In various embodiments, mobile device 300 comprises a smart mobile phone, a tablet computer, a laptop computer, an embedded system, or any other appropriate mobile device. Mobile device 300 performs real time object scanning. In some embodiments, mobile device 300 interacts with a cloud-based visual search engine to perform real time object scanning In the example shown, mobile device 300 comprises camera 302, image processor 304, object databases 306, network interface 308, results processor 310, and user interface 312. Camera 302 comprises a camera for recording images. In some embodiments, camera 302 comprises a still camera (e.g., records only one still image at a time). In some embodiments, camera 302 comprises a video camera (e.g., records images at a given rate, e.g., 5 frames per second, 10 frames per second, 30 frames per second, etc.). Image processor 304 comprises an image processor for processing images. In various embodiments, image processor 304 performs image cropping, image filtering, image transforming, image parameter extraction, object identification, object tagging, key frame detection, or any other appropriate image processing function. Object databases 306 comprise(s) one or more databases of object tags. In some embodiments, object databases 306 comprise(s) a copy of object databases 208. In some embodiments, object databases 306 comprises a subset of object databases 208. Network interface 308 comprises a network interface for communicating with a network (e.g., network 100 of FIG. 1). In some embodiments, object databases 306 are updated using network interface 308. In some embodiments, images are uploaded (e.g., to an image tagging system) and tags are downloaded via network interface 308. Results processor 310 comprises a processor for receiving and processing image tagging results (e.g., from object databases 306, image processor 304, or network interface 308). Results processor 310 determines result quality, selects the best results, and processes results for display by user interface 312. User interface 312 receives results from results processor 310 and displays results for a user. In various embodiments, user interface 312 receives an application start command, receives a stream select start command, displays an image stream to a user, displays an image tag to a user, or performs any other appropriate user interface function.

Figure 4:
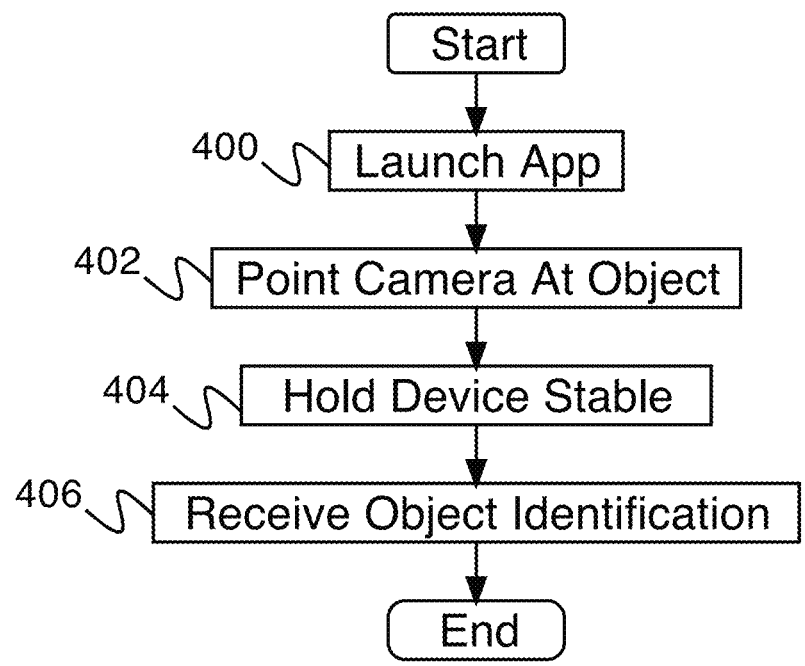
FIG. 4 is a flow diagram illustrating an embodiment of a process for using a system for real time object scanning.

FIG. 4 is a flow diagram illustrating an embodiment of a process for using a system for real time object scanning In some embodiments, the process of FIG. 4 is executed by a mobile device user using an app for real time object scanning using a mobile phone and cloud-based search engine. In some embodiments, the search engine is on the mobile phone. In the example shown, in 400, the app is launched. In 402, the camera is pointed at an object. In some embodiments, the camera is pointed at the object the user is interested in identifying. The user does not need to make an indication (e.g., click a button, etc.) to the mobile device that the camera is pointed at the object of interest or that the camera should take a photograph. In 404, the device is held stable. In some embodiments, the device is held stable for at least a predetermined period of time (e.g., 0.5 seconds, 5 seconds, etc.). In 406, an object identification is received. In some embodiments, an object identification is determined by the device and presented to the user. In some embodiments, the device interacts with an image tagging system (e.g., communicating via a network) to determine an object identification. In some embodiments, the image tagging system determines an object identification. In some embodiments, the image tagging system interacts with a human to determine an object identification. In some embodiments, an object identification comprises an object tag.

Figure 5A:
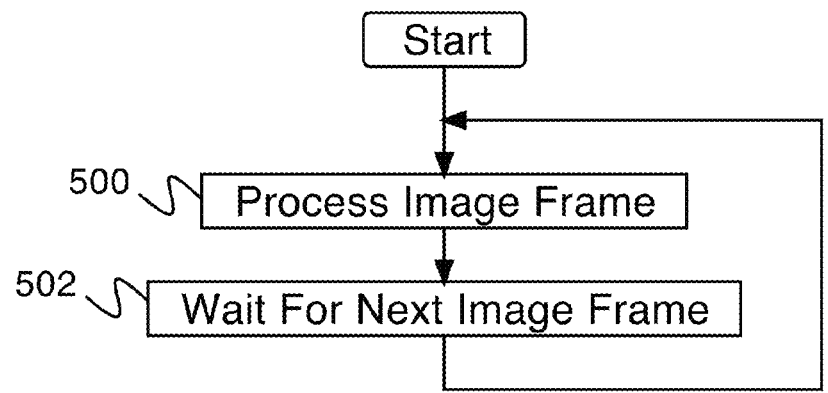
FIG. 5A is a flow diagram illustrating an embodiment of a process for processing a video stream.

FIG. 5A is a flow diagram illustrating an embodiment of a process for processing a video stream. In some embodiments, the process of FIG. 5A is executed by a mobile device (e.g., mobile device 300 of FIG. 3). The process of FIG. 5A is used by a mobile device for real time object scanning without interaction from a user (e.g., without requiring the user to make an indication of the object of interest or manually indicate to take a photograph). In the example shown, in 500, an image frame is processed. In some embodiments, processing an image frame comprises determining if the image frame is a key frame. In some embodiments, an image frame received from a camera is processed. In various embodiments, image frames are captured at 1 frame per second, 5 frames per second, 10 frames per second, 30 frames per second, or at any other appropriate rate. In 502, the process waits for the next image frame. Once the next image frame has been received, control passes back to 500.

Figure 5B:
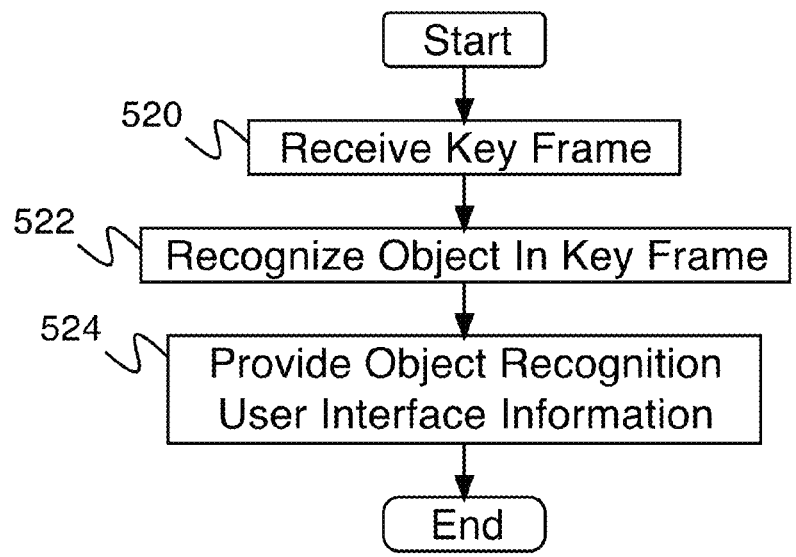
FIG. 5B is a flow diagram illustrating an embodiment of a process for processing a key frame.

FIG. 5B is a flow diagram illustrating an embodiment of a process for processing a key frame. In some embodiments, the process of FIG. 5B is used to indicate an object tag in a key frame to a user. In the example shown, in 520, a key frame is received. In some embodiments, the key frame comprises a key frame identified in 500 of FIG. 5A. In some embodiments, a key frame comprises a frame where the image is still (e.g., not blurry). In some embodiments, a key frame comprises a frame where the image is still and the image has been still for a predetermined number of frames before it. In some embodiments, a key frame comprises a frame where the image's visual content is different from the previously detected key frames. In 522, an object is recognized in the key frame. In some embodiments, the object is recognized by the mobile device. In some embodiments, the object is recognized by an image tagging system. In 524, object recognition user interface information is provided. In some embodiments, providing object recognition user interface information comprises displaying an object tag.

Figure 6:
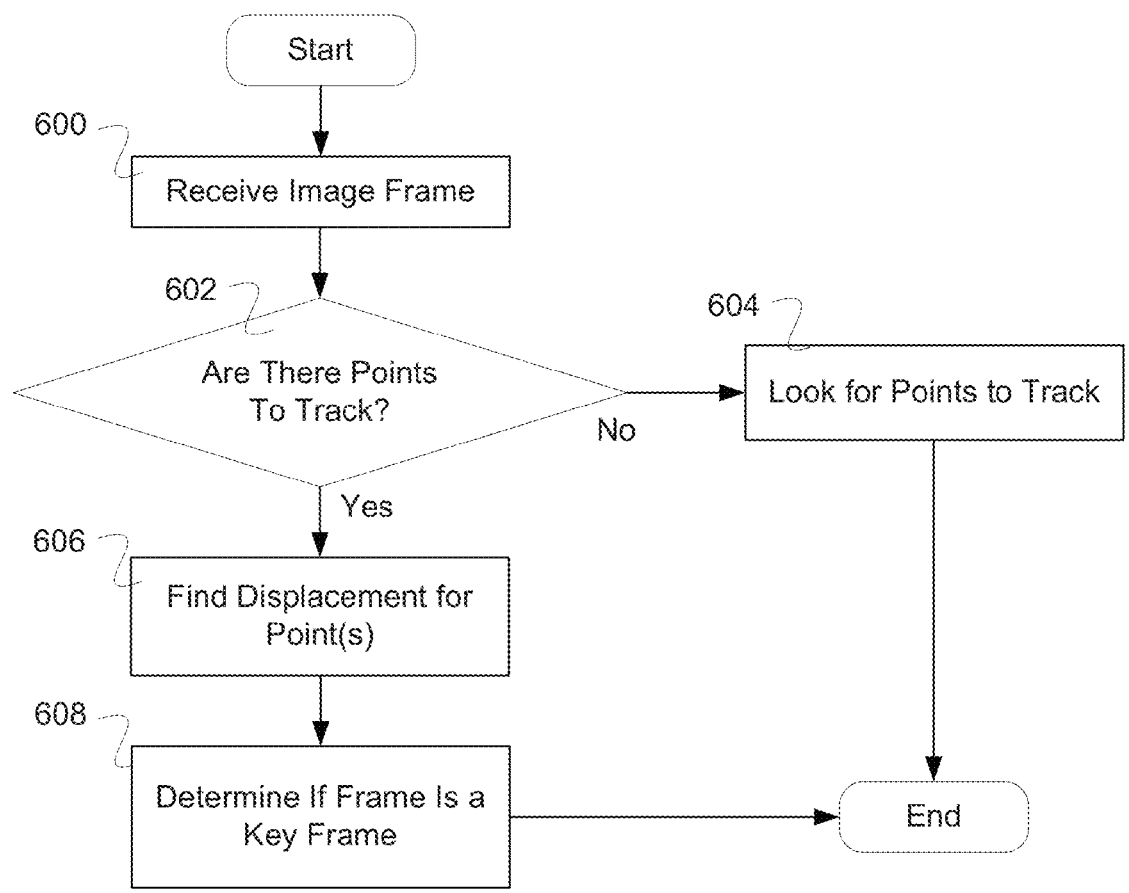
FIG. 6 is a flow diagram illustrating an embodiment of a process for processing an image frame.

FIG. 6 is a flow diagram illustrating an embodiment of a process for processing an image frame. In some embodiments, the process of FIG. 6 is executed by image processor 304 of FIG. 3. An image processor uses the process of FIG. 6 for processing a received image frame and determining if the image frame is locked onto an object. In some embodiments, the process of FIG. 6 implements 500 of FIG. 5A. In the example shown, in 600, an image frame is received. In some embodiments, the image frame is received from a camera. In some embodiments, the image frame is part of a video stream. In 602, it is determined whether there are points to track. In the event that there are not points to track, in 604 points to track are looked for, and then the process ends. In the event that there are points to track, in 606 displacement for point(s) are found. In 608, it is determined if a frame is a key frame.

In some embodiments, features are extracted at salient locations such as corners or object contours. A local patch centered around the salient location is encoded. The encoding typically captures histograms of oriented edge energy. The features are compared to the features in the previous frame, and are used to compute the optical flow. In some embodiments, optical flow is estimated using a Lukas Kanade algorithm. It is determined which feature(s) is/are locked onto. In some embodiments, feature(s) is/are used to determine an object tag. In some embodiments, determining whether feature(s) is/are locked comprises checking to see if feature(s) have been found in a previous frame. In some embodiments, if feature(s) have been locked, the image is steady and a key frame can be detected. In the event feature(s) is/are locked, it is determined if the frame is a key frame. If it is determined that feature(s) have not been locked, feature(s) is/are looked for. In some embodiments, it is determined whether feature(s) have been found. In the event feature(s) have been found, the lock on to feature(s) is indicated. For example, a software module is informed (e.g., by passing a message or indication) that the feature(s) are locked and that the process may proceed (e.g., to process additional images to determine a key frame). Or for example, the lock is stored or recorded (e.g., in a data structure or in memory location(s)). In some embodiments, after the lock on to feature(s) is indicated, the next time the process is executed (e.g., in response to the next image frame received), it will be determined that feature(s) is/are locked. If it is determined that feature(s) have not been found, the process ends. In some embodiments, a lack of lock on to features is indicated (e.g., stored, recorded, passed as an indication or variable to a software module, etc.).

Figure 7:
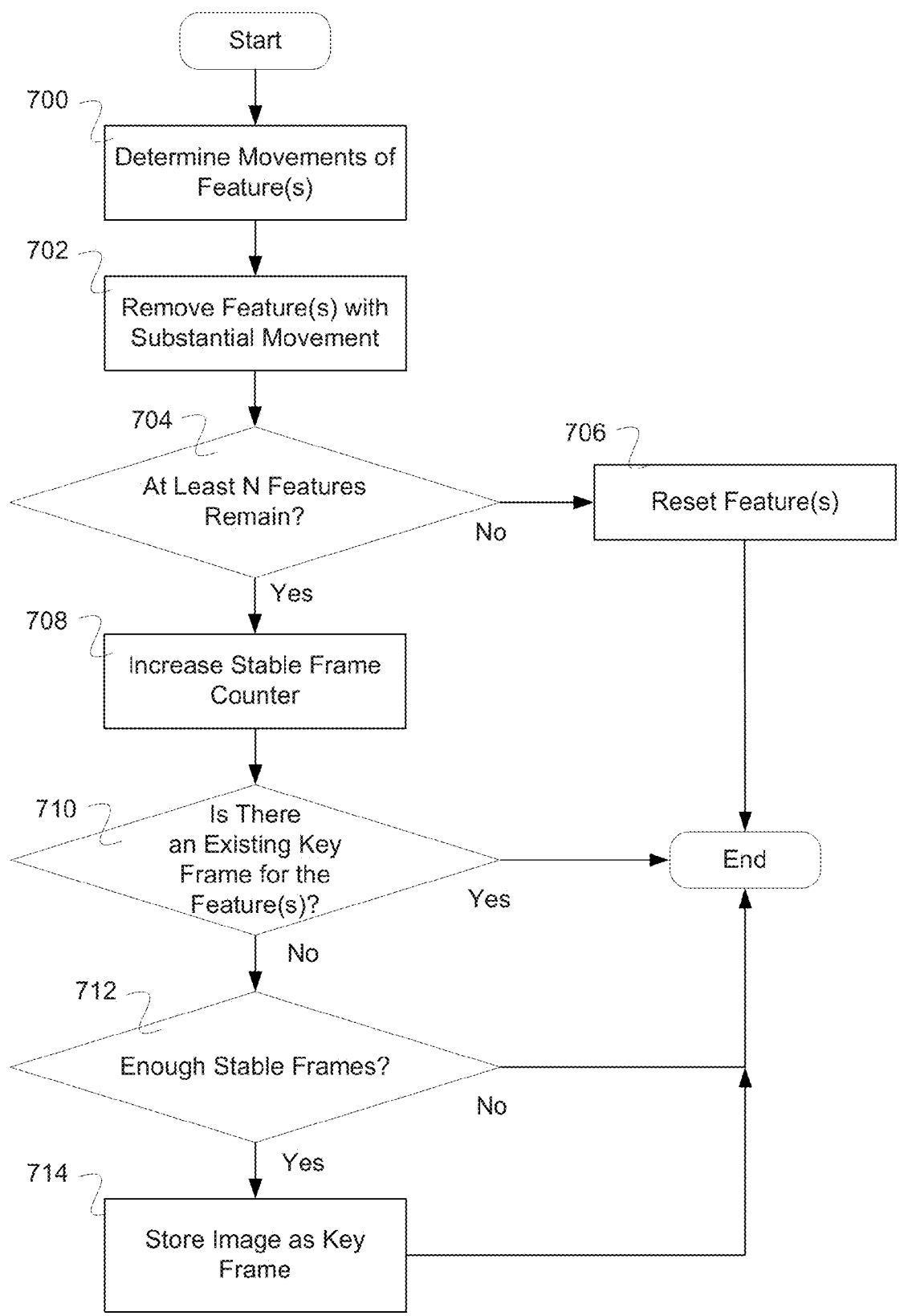
FIG. 7 is a flow diagram illustrating an embodiment of a process for determining if a frame is a key frame.

FIG. 7 is a flow diagram illustrating an embodiment of a process for determining if a frame is a key frame. In some embodiments, the process if FIG. 7 implements 608. An image processor uses the process of FIG. 7 for processing a received image frame and determining if the image frame is a key frame. In the example shown, in 700, movement of feature(s) (e.g., movement of features since the last frame, blurriness of features, etc.) is determined. In 702, feature(s) with substantial movement (e.g., features that have moved more than a threshold since the last frame, features that are above a blurriness threshold, etc.) are removed. In 704, it is determined whether at least N features remain. In the event that less than N features remain, control passes to 706. In 706, feature(s) is/are reset. In the event that it is determined in 704 that at least N features remain, control passes to 708. In 708, stable frame counter is increased. In some embodiments, the value stored in the stable frame counter represents the duration that the image has been stable. In 710, it is determined whether there is an existing key frame for the feature(s). In the event that there is an existing key frame for the feature(s), the process ends. In the event that there is not an existing key frame for the feature(s), then in 712 it is determined whether there are enough stable frames. In the event that there are not enough stable frames, the process ends. In the event that there are enough stable frames, in 714 the image is stored as key frame, and the process ends.

In some embodiments, an accelerometer measurement is used to determine whether there are stable frames. In some embodiments, the accelerometer is associated with a mobile phone.

In some embodiments, a key frame has different visual content from a previous key frame. In some embodiments, a key frame has the same visual content from a previous key frame.

Figure 8:
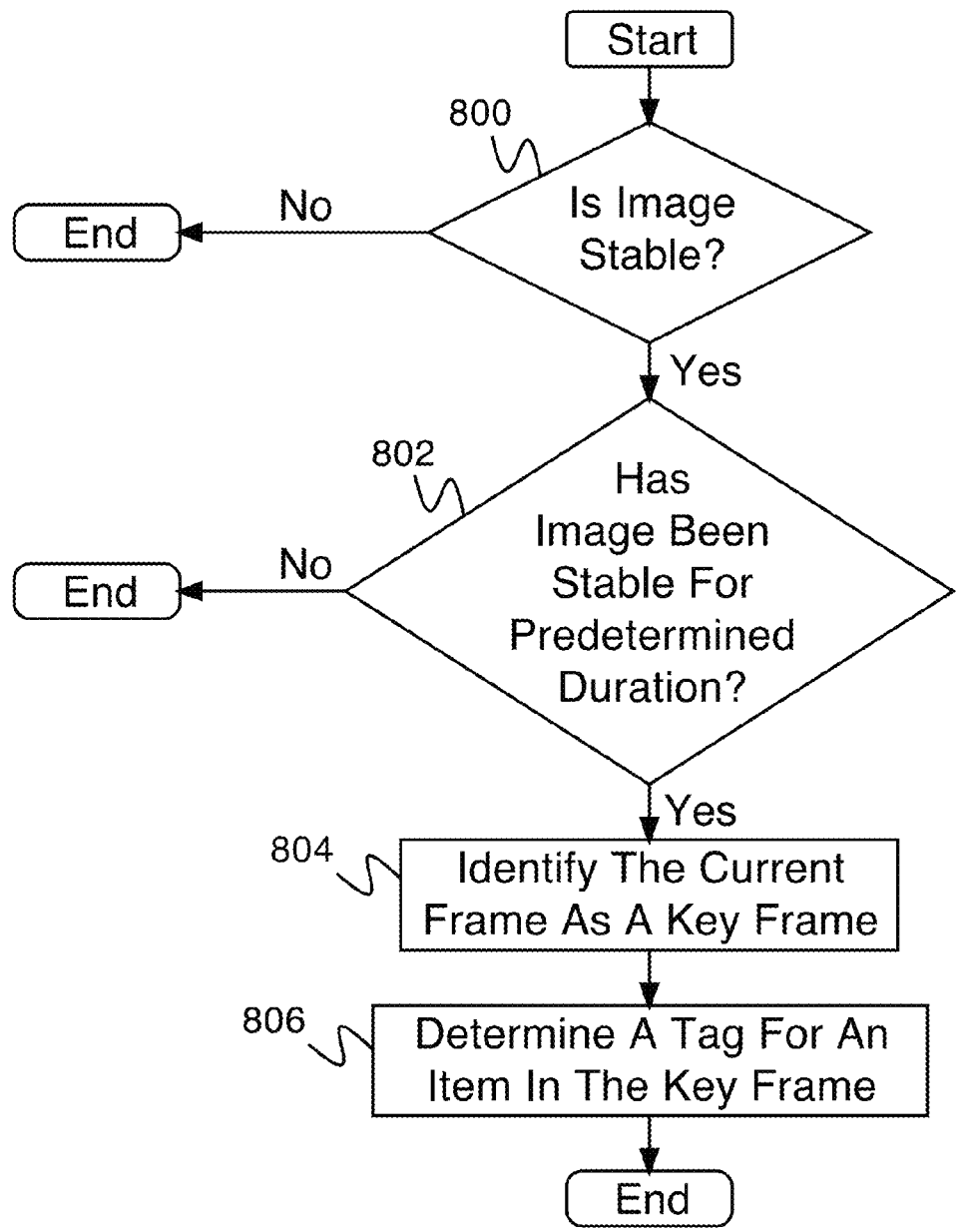
FIG. 8 is a flow diagram illustrating an embodiment of a process for tagging an object.

FIG. 8 is a flow diagram illustrating an embodiment of a process for tagging an object. In some embodiments, the process of FIG. 8 is executed by mobile device 300 of FIG. 3. The process of FIG. 8 is used for real time object scanning using a mobile phone and cloud-based search engine. In some embodiments, the process of FIG. 8 is executed on each frame of an incoming image stream. In the example shown, in 800, it is determined whether the image is stable. If it is determined that the image is not stable, the process ends. In some embodiments, the process is then repeated on the next image frame. If it is determined in 800 that the image is stable, control passes to 802. In 802, it is determined if the image has been stable for a predetermined duration. If it is determined that the image has not been stable for the predetermined duration, the process ends. In some embodiments, the process is then repeated on the next image frame. If it is determined in 802 that the image has been stable for the predetermined duration, control passes to 804. In 804, the current frame is identified as a key frame. In 806, a tag is determined for an item in the key frame. In some embodiments, the tag is determined by a machine. In some embodiments, the process additionally determines whether the tag is determined by a machine or by a human.

In some embodiments, in the event it is determined that the tag cannot be determined by a machine, the tag is determined by a human.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   an interface configured to receive, via a network, an image generated by a camera of a mobile device;
   a memory; and
   a processor, at least one of the processor or the memory being configured to:
      determine a key frame of the image, wherein determining a key frame comprises determining that the image is stable;
      determine a tag for an item in the key frame based, at least in part, upon the tag being received from one or more human taggers;
      determine a validity of the tag received from the one or more human taggers based, at least in part, upon a status of the one or more human taggers from which the tag was received; and
      providing tagging results to the mobile device in real time based, at least in part, on the validity of the tag received from the one or more human taggers;
      wherein a plurality of human taggers including the human taggers are divided into separate groups according to one or more characteristics including their average time of providing tags.

2. A system as in claim 1, wherein determining that the image is stable comprises determining that at least a particular number of a plurality of features of the image remain that have not moved more than a threshold.

3. A system as in claim 2, wherein a percentage of the plurality of features is above a threshold for a predetermined number of frames.

4. A system as in claim 2, wherein a number of the plurality of features is above a threshold for a predetermined number of frames.

5. A system as in claim 2, wherein each of the plurality of features is in a current frame and a prior frame.

6. A system as in claim 1, at least one of the processor or the memory being configured to:
   determine movement associated with a plurality of features of the image;
   in the event that a specific feature of the plurality of features has movement above a threshold, remove the specific feature from the plurality of features such that a reduced set of features is generated;
   determine a tag for an item in the key frame based, at least in part, upon at least a portion of the reduced set of features;
   wherein the specific feature is in the current frame and in a prior frame.

7. A system as in claim 1, wherein the mobile device comprises a mobile phone.

8. A system as in claim 1, wherein the mobile device comprises a tablet.

9. A system as in claim 1, wherein the key frame has visual content different from visual content from a previous key frame.

10. A system as in claim 1, the human taggers being associated with a particular specialty, wherein the status of each of the human taggers indicates whether the human tagger is an expert.

11. A system as in claim 1, wherein the one or more human taggers have a common set of characteristics including a particular location.

12. A computer-implemented method, comprising:
    receiving, via a network, an image from a mobile device;
    determining, by a processor, a key frame of the image, wherein determining a key frame comprises determining that an image is stable;
    determining a tag for an item in the key frame based, at least in part, upon the tag being received from one or more human taggers;
    determining a validity of the tag received from the one or more human taggers based, at least in part, upon a status of the one or more human taggers from which the tag was received; and
    providing tagging results to the mobile device in real time based, at least in part, on the validity of the tag received from the one or more human taggers;
    wherein the one or more human taggers share a common set of characteristics, the common set of characteristics including a particular average time to provide results;
    wherein a plurality of human taggers including the human taggers are divided into separate groups according to one or more characteristics including their average time of providing tags.

13. A computer-implemented method as in claim 12, wherein the tag is determined using a human computation module configured to communicate with the one or more human taggers.

14. A computer-implemented method as in claim 13, further comprising:
    requesting, by the human computation module, the tag from the one or more human taggers.

15. A computer-implemented method as in claim 14, wherein the one or more human taggers have a common set of characteristics, the common set of characteristics including at least one of a location or specialty.

16. A computer-implemented method as in claim 13, wherein the tag is determined using the human computation module after determining that the tag could not be determined using a computer vision module.

17. A computer-implemented method as in claim 12, wherein the status of each of the human taggers indicates whether the human tagger is a reliable tagger.

18. A computer-implemented method as in claim 12, the human taggers being associated with a particular specialty, wherein the status of each of the human taggers indicates whether the human tagger is an expert.

19. A computer-implemented method as in claim 12, further comprising:
    marking the tag received from the one or more human taggers with a validity status based on the status of the one or more human taggers.

20. A computer-implemented method as in claim 12, wherein the tag is provided for display via the mobile device.

21. The method as recited in claim 12, wherein the common set of characteristics comprise a particular location and a particular specialty.

22. A computer program product, the computer program product being embodied in a non-transitory computer readable storage medium and comprising computer instructions for:

receiving, via a network, an image from a mobile device;

determining, by a processor, a key frame of the image, wherein determining a key frame comprises determining that an image is stable;

determining a tag for an item in the key frame based, at least in part, upon the tag being received from one or more human taggers;

determining a validity of the tag received from the one or more human taggers based, at least in part, upon a status of the one or more human taggers from which the tag was received; and providing tagging results to the mobile device in real time based, at least in part, on the validity of the tag received from the one or more human taggers;

wherein a plurality of human taggers including the human taggers are divided into separate groups according to one or more characteristics including their average time of providing tags.

23. A computer program product as in claim 22, wherein the image is stable if the image has been still for at least a predetermined number of frames.

24. A computer program product as in claim 22, further comprising:

determining whether to add the image to an object database in association with the tag; and storing the image in the object database in association with the tag according to a result of determining whether to add the image to the object database in association with the tag.

25. A computer program product as in claim 22, further comprising instructions for:

extracting features at object contours of the image;

removing features from the extracted features that are above a blurriness threshold such that a reduced set of features is generated; and determining a tag for an item in the key frame based, at least in part, upon at least a portion of the reduced set of features.

* * * * *